(12) United States Patent
Akers et al.

(10) Patent No.: US 6,425,343 B1
(45) Date of Patent: Jul. 30, 2002

(54) SHAPE MEMORY ALLOY THERMAL EXPOSURE MONITOR

(76) Inventors: Jeffrey W. Akers, 1411 Anthony St., Columbia, MO (US) 65201; James Michael Zerkus, 2437 Bay Area Blvd., Suite 234, Houston, TX (US) 77058

( * ) Notice: Subject to any disclaimer, the term of this patent is extended or adjusted under 35 U.S.C. 154(b) by 0 days.

(21) Appl. No.: 09/301,418

(22) Filed: Apr. 28, 1999

Related U.S. Application Data

(60) Provisional application No. 60/083,274, filed on Apr. 28, 1998.

(51) Int. Cl.[7] .............................. G01K 1/02; G01K 3/00; G01K 5/00
(52) U.S. Cl. ..................... 116/216; 374/187; 374/205
(58) Field of Search ...................... 116/216, 221, 116/207; 426/88; 374/102, 104, 106, 187, 205, 206, 207

(56) References Cited

U.S. PATENT DOCUMENTS

| 2,966,261 A | * | 12/1960 | Bradbury | 116/221 |
| 3,214,278 A | * | 10/1965 | Mylo | 116/221 |
| 3,483,752 A | * | 12/1969 | Rogen et al. | 116/216 |
| 3,954,011 A | | 5/1976 | Manske | |
| 4,007,637 A | | 2/1977 | Nakagawa | |
| 4,114,559 A | * | 9/1978 | Rogen | 116/216 |
| 4,448,147 A | * | 5/1984 | Dewaegheneire | 116/216 |
| 5,018,874 A | | 5/1991 | Girones | |
| 5,076,197 A | | 12/1991 | Darringer et al. | |
| 5,335,994 A | * | 8/1994 | Weynant Nee Girones | 116/216 |
| 5,531,180 A | * | 7/1996 | Bianchini | 161/216 |
| 5,735,607 A | * | 4/1998 | Shahinpoor et al. | 116/216 |

FOREIGN PATENT DOCUMENTS

FR           2664383    *   1/1992  ................. 116/216

* cited by examiner

*Primary Examiner*—Diego Gutierrez
*Assistant Examiner*—Yaritza Guadalupe
(74) *Attorney, Agent, or Firm*—Kenneth A. Roddy

(57) ABSTRACT

A thermal exposure monitor has a thermally-conductive housing adapted to be placed in close proximity to a product to be monitored and at least one thermally-responsive shape memory alloy member in the housing that has a first shape at temperatures below a critical temperature and a second shape at temperatures above the critical temperature and a transformation temperature range encompassing a prescribed detrimental temperature related to the product being monitored. An indicator associated with the thermally-responsive member is moved from an initial position as the thermally-responsive member changes from the first shape to the second shape so as to be visually observed through a window on the housing to visually indicate whether the product being monitored has been exposed to temperatures above the prescribed detrimental temperature for a period of time that would be detrimental to the product.

2 Claims, 9 Drawing Sheets

SHAPE MEMORY ALLOY THERMAL EXPOSURE MONITOR

CROSS REFERENCE TO RELATED APPLICATION

This application claims priority of the filing date of provisional patent application Serial No. 60/083,274, filed Apr. 28, 1998.

BACKGROUND OF THE INVENTION

1. Field of the Invention

This invention relates generally to temperature indicators and monitors, and more particularly to a small shape memory alloy thermal exposure monitor calibrated to closely match the thermal characteristics of a perishable product and indicate whether the product has been exposed to temperatures outside of a prescribed range for an amount of time that would be detrimental to the particular product.

2. Brief Description of the Prior Art

It is of utmost importance to maintain processed produce such as food products and perishable non-food products such as medical products, drugs, research reagents, pharmaceuticals, human organs and tissues, etc., within a predetermined temperature range and to determine whether such products may have been exposed to detrimental temperatures outside the specified temperature range during some step in the chain of distribution from the source to the destination.

The demand for processed produce and perishable non-food products has pushed the limits of the distribution systems of the perishable products industry to maintain an unbroken cold chain from field to consumer and industry. Many segments of the food industry utilize a Hazard Analysis and Critical Control Point system (HACCP) which is a world-recognized, common sense approach to food safety and prevention of food contamination.

The HACCP has outlined seven principles for food safety and prevention of food contamination: (1) Conduct a hazard analysis to identify potential hazards that could occur in the food production process; (2) Identify the critical control points (CCPs)—those points in the process where the potential hazards could occur and can be prevented and/or controlled; (3) Establish critical limits for preventive measures associated with each CCP; (4) Monitor each CCP to ensure it stays within the limits; (5) Take corrective actions when monitoring determines a CCP is not within the established limits; (6) Keep records that document the HACCP system is monitored and working correctly; and (7) Verify that the HACCP system is working properly through tests and other measures.

Existing HACCP programs in place at the processing end of the chain are not equipped with proper tools to monitor all of the critical control points (CCP's) in the cold chain, and temperature related problems can still occur throughout the distribution chain. Thus, there is a need for a device that can be used for economically monitoring the links in the cold chain, especially when perishable loads are broken up and re-distributed.

Temperature monitors and indicators are known in the art. There are several patents that disclose various electronic and mechanical temperature indicating devices.

Nakagawa et al, U.S. Pat. No. 4,007,637 discloses an electronic and mechanical temperature recorder which produces a continuous graphic record, scribed on a removable tape, of the temperature existing in an enclosure, such as a refrigerated railroad car, during a given period of time (e.g., the transit time of such a railroad car). This type of device is a complex mechanism and, due to its expense, would be impractical to utilize in applications where the present invention is used.

Dewaegheneire, U.S. Pat. No. 4,448,147; Weynant nee Girones, U.S. Pat. Nos. 5,018,874 and 5,335,994; and Darringer et al, U.S. Pat. No. 5,076,197 disclose "step" type temperature monitors. These devices differ from the present invention in that they merely measure and indicate whether one or more temperature thresholds have been achieved. The present cumulative thermal exposure monitor, on the other hand, acts as an integrating calorimeter once a threshold temperature has been achieved, and measures heat and relates that measurement to the degree of spoilage in the product.

Manske, U.S. Pat. No. 3,954,011 discloses an example of an enzymatic color indicator of the prior art. Enzymatic color indicators are used to show the amount of temperature abuse of a stored or shipped temperature-sensitive commodity. This technology has a limited operating temperature range, is relatively expensive, and there may be a risk of interaction of the indicator solution with the products or food.

Shahinpoor, U.S. Pat. No. 5,735,607 discloses a temperature sensor having an indication surface, at least one shape memory alloy (SMA) member with a first shape at temperatures below a critical temperature and a second shape at temperatures above the critical temperature, and a plurality of indicators mounted with the members which obscure the indication surface when the members are in the first shape, and do not obscure the indication surface when the members are in their second shape. This device only indicates that a temperature threshold was exceeded, and must always be maintained at a temperature below the transformation temperature of the shape memory alloy member(s) until the beginning of the sensing operation.

The present invention is distinguished over the prior art in general, and these patents in particular by a thermal exposure monitor which has a thermally-conductive housing adapted to be placed in close proximity to a product to be monitored and at least one thermally-responsive shape memory alloy member contained in the housing having a first shape at temperatures below a critical temperature and a second shape at temperatures above the critical temperature and a transformation temperature range encompassing a prescribed detrimental temperature related to the product being monitored. An indicator associated with the thermally-responsive member is moved from an initial position as the thermally-responsive member changes from the first shape to the second shape so as to be visually observed through a window on the housing to visually indicate whether the product being monitored has been exposed to temperatures above the prescribed detrimental temperature for a period of time that would be detrimental to the product.

SUMMARY OF THE INVENTION

It is therefore an object of the present invention to provide a cumulative thermal exposure monitor that is calibrated to closely match the thermal characteristics of a perishable product being monitored.

It is another object of this invention to provide a cumulative thermal exposure monitor that monitors and indicates whether a product or container with which it is associated has been exposed to temperatures outside of a predetermined range for a period of time that would be detrimental to the product.

Another object of this invention is to provide a cumulative thermal exposure monitor that can be used with perishable food products and non-food products such as medical products, drugs, research reagents, pharmaceuticals, human organs and tissues, etc., to indicate whether such products may have been exposed to detrimental temperatures outside a specified temperature range during some step in the chain of distribution from the source to the destination.

Another object of this invention is to provide a cumulative thermal exposure monitor that has a large functional temperature range of from about −200° C. to about 135° C.

Another object of this invention is to provide a cumulative thermal exposure monitor that can be sterilized by chemicals, ionizing radiation or heat.

Another object of this invention is to provide a cumulative thermal exposure monitor that can serve as an inexpensive, convenient and effective regulatory tool for HACCP programs and allow real time decisions to be made as to the safety or quality of a perishable product.

Another object of this invention is to provide a cumulative thermal exposure monitor that may reduce liability by indicating, package by package, whether the history of a particular perishable product was within proper limits while it was in transit or storage.

A further object of this invention is to provide a cumulative thermal exposure monitor made of inert plastic and bio-compatible metal that is food-safe and has no danger of contaminating the product it is monitoring.

A still further object of this invention is to provide a cumulative thermal exposure monitor that is inexpensive to manufacture, may be disposable, and is economical to install on individual containers.

Other objects of the invention will become apparent from time to time throughout the specification and claims as hereinafter related.

The above noted objects and other objects of the invention are accomplished by a thermal exposure monitor which has a thermally-conductive housing adapted to be placed in close proximity to a product to be monitored and at least one thermally-responsive shape memory alloy member contained in the housing having a first shape at temperatures below a critical temperature and a second shape at temperatures above the critical temperature and a transformation temperature range encompassing a prescribed detrimental temperature related to the product being monitored. An indicator associated with the thermally-responsive member is moved from an initial position as the thermally-responsive member changes from the first shape to the second shape so as to be visually observed through a window on the housing to visually indicate whether the product being monitored has been exposed to temperatures above the prescribed detrimental temperature for a period of time that would be detrimental to the product.

DESCRIPTION OF THE PREFERRED EMBODIMENTS

Figure 1:
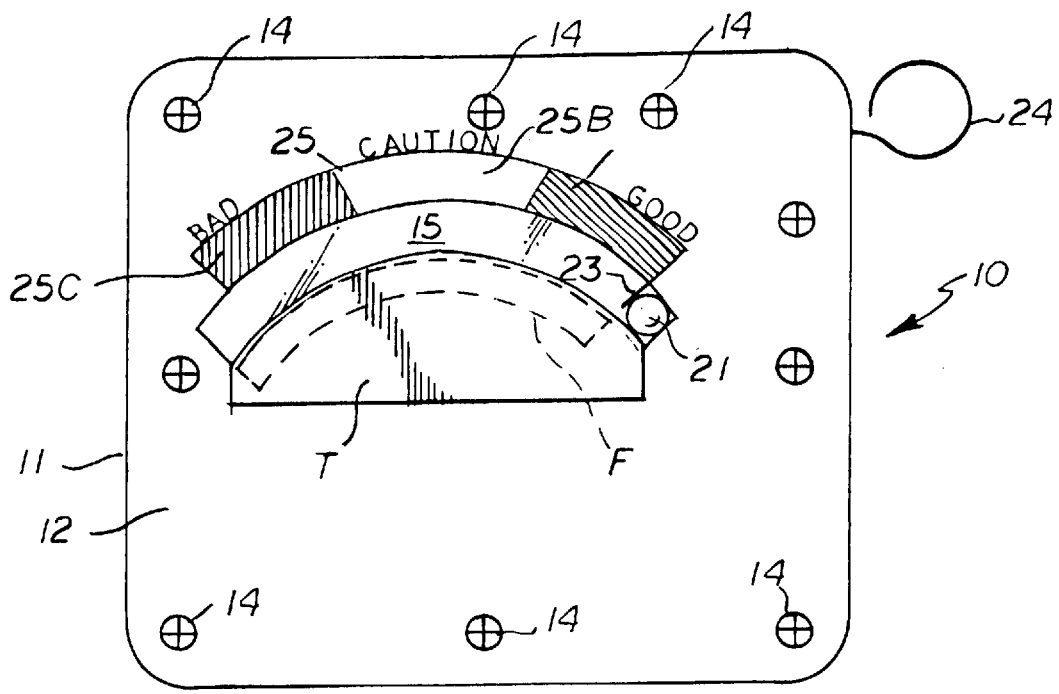
FIG. 1 is an enlarged front view of the face of a preferred single-use disposable embodiment of the cumulative thermal exposure monitor in accordance with the present invention.

The present invention utilizes the unique phase transformation properties (shape memory and superelasticity) of "Shape Memory Alloy" (SMA) materials. Shape memory alloys undergo a reversible phase transformation in their crystal structure when heated from a low temperature form to a high temperature form. Transformation temperatures can be accurately set between −200° C. to 200° C. by varying the composition of the alloy and annealing procedure when forming the shape memory alloy wire. Suitable shape memory alloy materials include Ag—Cd, Au—Cd, Cu—Al—Ni, Cu—Sn, In—Ti, Ni—Al, Ni—Ti, Fe—Mn—Si, Cu—Zn—Al, and U—Ni.

Upon heating or cooling, shape memory alloys do not completely undergo their phase transformation at one particular temperature. Instead, the transformation begins at one temperature (known as the start temperature) and is completed at another temperature (known as the finish temperature). Further, there is a difference in the transformation temperatures upon heating from the first phase to the second phase (martensite to austenite for example in Ni—Ti) and cooling from the second phase to the first (austenite to martensite), resulting in a delay or "lag" in the transformation. This difference is known as the transformation temperature hysteresis. The transformation temperature hysteresis can also be effected by alloying, cold working and heat treatment.

The terms used in the following discussion are meant to have the following meanings. The "austenitic start temperature" ($A_s$ temperature) is the temperature at which a shape memory alloy starts transforming to austenite upon heating. The "austenitic finish temperature" ($A_f$ temperature) is the temperature at which a shape memory alloy finishes transforming to austenite upon heating. "Austenite" is the higher temperature phase present in Ni—Ti, for example.

The "martensitic start temperature" ($M_s$ temperature) is the temperature at which a shape memory alloy starts transforming to martensite upon cooling. The "martensitic finish temperature" ($M_f$ temperature) is the temperature at which a shape memory alloy finishes transforming to martensite upon cooling. "Martensite" is the more deformable, lower temperature phase present in Ni—Ti, for example. "Hysteresis" is the temperature difference between a phase transformation upon heating and cooling. "shape memory" is the ability of certain alloys to return to a predetermined shape upon heating via a phase transformation. "Superelasticity" is the springy, "elastic" behavior present in shape memory alloys, such as Ni—Ti, at temperatures just above the $A_f$ temperature. The superelasticity arises from the formation and reversion of stress-induced martensite.

The present cumulative thermal exposure monitors in general rely on the difference between the $A_f$ (austenitic finish) temperature and the $A_s$ (austenitic start) temperature to provide analog information about its surroundings. Temperature and injected heat criteria (heat is a function of time and temperature) must be met before the alloy can progress between the $A_s$ temperature and the $A_f$ temperature. By observing the physical shape memory response in such an alloy, one can ascertain the cumulative value of its exposure to temperature with respect to time (total heat injected above a threshold temperature). In some embodiments, the cumulative thermal exposure monitors also use superelasticity and hysteresis to some extent in latching, resetting and general operation.

Figure 2:
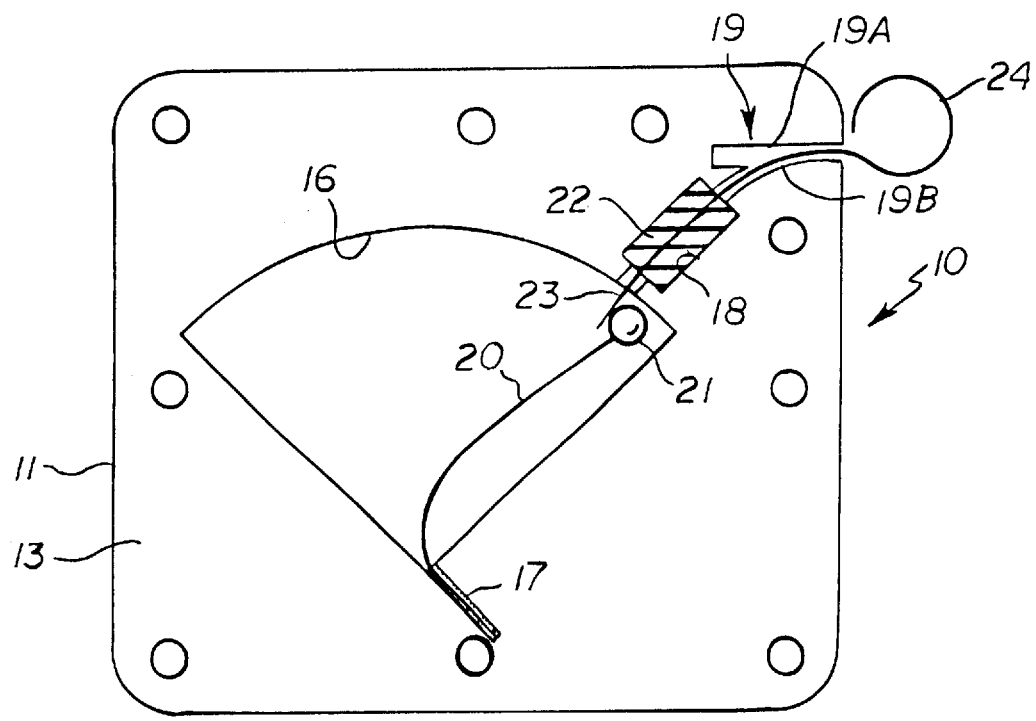
FIG. 2 is an enlarged front view of the single-use disposable embodiment of FIG. 1 with the faceplate removed.

Referring now to the drawings by numerals of reference, there is shown in FIGS. 1 and 2, a preferred single-use, non-resettable or disposable embodiment of the cumulative thermal exposure monitor 10 in accordance with the present invention. The monitor 10 has a generally rectangular thermodynamic outer housing 11 which, in a preferred embodiment, is about the size of a postage stamp and is formed of a faceplate 12 and a back plate 13 secured together such as by screws 14, adhesives, or other conventional fastening means. The faceplate 12 and back plate 13 are formed of a rigid thermally conductive plastic or composite material capable of being sterilized by chemicals, heat or ionizing radiation. The faceplate 12 has a clear arcuate window portion 15. The materials and thickness of the outer housing plates 12 and 13 are selected to provide a known desired thermal conductivity based upon the type of food or product for which it is to be used. Although the housing is shown for purposes of illustration as being rectangular, it should be understood that the housing may be circular or various other configurations.

The front surface of the back plate 13 has a pie-shaped recess 16 with a small slot 17 extending a short distance outwardly from the apex of the pie-shape. An upper recess 18 extends outwardly from the curved portion of the pie-shaped recess 16 near one side. A generally Y-shaped recess 19 formed in the back plate has a first leg 19A extending inwardly from one the side and a second leg 19B that curves downwardly from the first leg and adjoins the upper recess 18.

A stiff thin rectangular strip or wire of shape memory alloy (SMA) material 20 having a straight remembered configuration has one end secured in the slot 17 at the apex of the pie-shaped recess 16 and has an enlarged colored marker 21, such as a bead, at its opposed free end. A self-sealing synthetic rubber or elastomeric seal 22 is disposed in the upper recess 18. One end of a thin stiff wire latch pin 23 extends through the seal 22 and its opposed end 24 remains outside of the outer housing 11.

As seen in FIG. 2, in the inactive position, the free end of the shape memory alloy wire 20 is biased toward one side of the pie-shaped recess 16 and the inward facing end of the latch pin 23 extends downwardly into the pie-shaped recess to engage the free end of the wire or marker 21 and hold it in its curved biased position. With the shape memory alloy wire 20 in the inactive latched position, the pie-shaped recess 16 is filled with a fluid such as propylene glycol or air, or the air is removed to create a vacuum, and the faceplate 12 and back plate 13 are sealed together to provide a fluid tight unit. To activate the device, the pin 23 is pulled completely out of the seal 22 and outer housing 11 to allow the shape memory alloy wire 20 to change from its initial shape to its remembered straight shape upon exposure to its transformation temperature.

An adhesive material (not shown) may be applied to the back surface of the back plate 13 of the outer housing 11 for attaching the housing to a product or food packaging material. A scale 25 is disposed on the front surface of the faceplate 12 above the arcuate window 15. The scale 25 is provided with calibrations 25A, 25B, 25C that relate the deflection of the shape memory alloy wire 20 to the degree of spoilage of the product.

Figure 3:
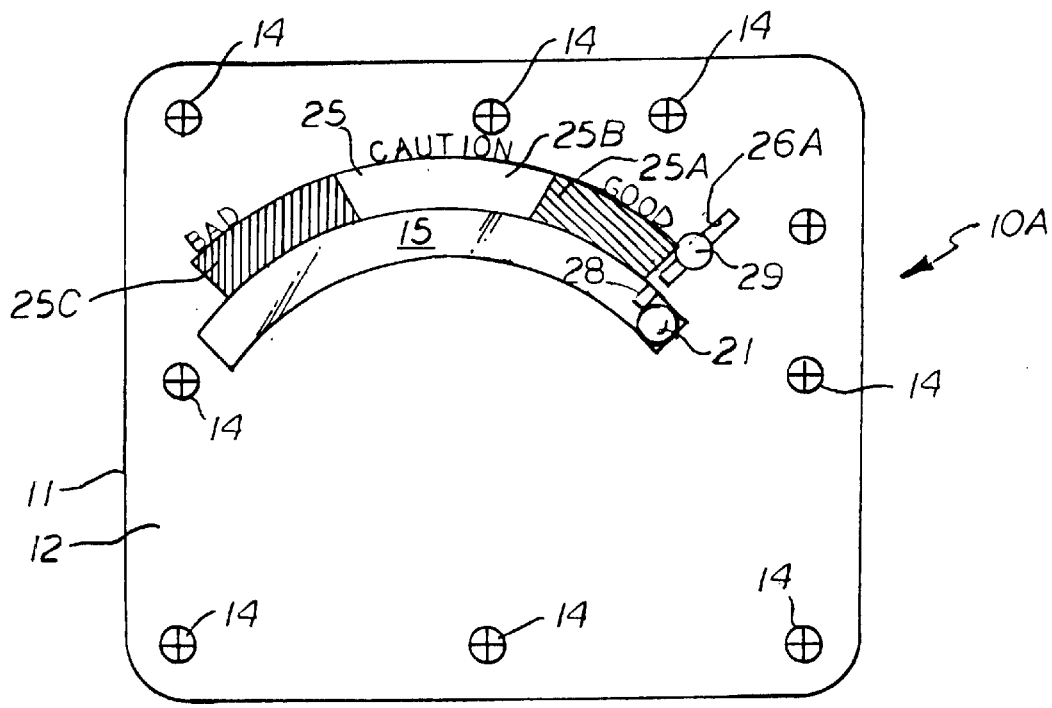
FIG. 3 is an enlarged front view of the face of a modification of the disposable cumulative thermal exposure monitor of FIGS. 1 and 2, having a different latch pin arrangement.
Figure 4:
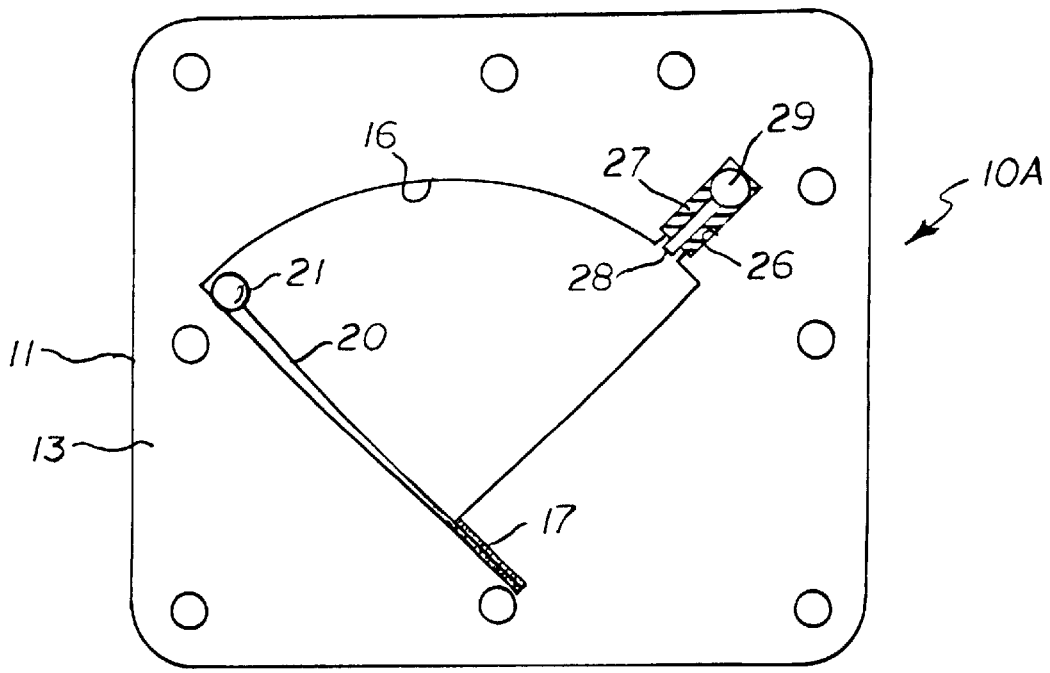
FIG. 4 is an enlarged front view of the embodiment of FIG. 3 with the faceplate removed and the latch pin retracted.

FIGS. 3 and 4 shown a modification of the disposable cumulative thermal exposure monitor 10A having a different latch pin arrangement. In FIGS. 3 and 4, the same numerals of reference are used to identify the components previously described, but the detailed description of the components will not be repeated to avoid repetition. In this modification, the previously described Y-shaped recess 19 is replaced with a straight slot 26 formed in the back plate 13 that extends a short distance angularly outwardly from the curved portion of the pie-shaped recess 16 toward a corner of the back plate. A synthetic rubber or elastomeric seal 27 having a central bore is disposed in the lower end of the slot 26.

One end of a thin stiff latch pin 28 extends through the bore of the seal 27 and its opposed end has a small bead or protuberance 29 that extends upwardly through a narrow rectangular aperture 26A in the faceplate 12 for sliding the pin 28 in and out relative to the pie-shaped recess 16. In the inactive position, the free end of the shape memory alloy wire 20 is biased toward one side of the pie-shaped recess 16 and the inner facing end of the latch pin 28 extends downwardly into the pie-shaped recess to engage the free end of the wire or marker 21 to hold it in its curved biased position. To activate the device, the pin 28 is retracted to allow the shape memory alloy wire 20 to change from its initial shape to its remembered straight shape. FIG. 4 shows the pin 28 retracted and the shape memory alloy wire 20 in an indicating position after the device has been affixed to the food or product and given time to cool down.

Figure 5:
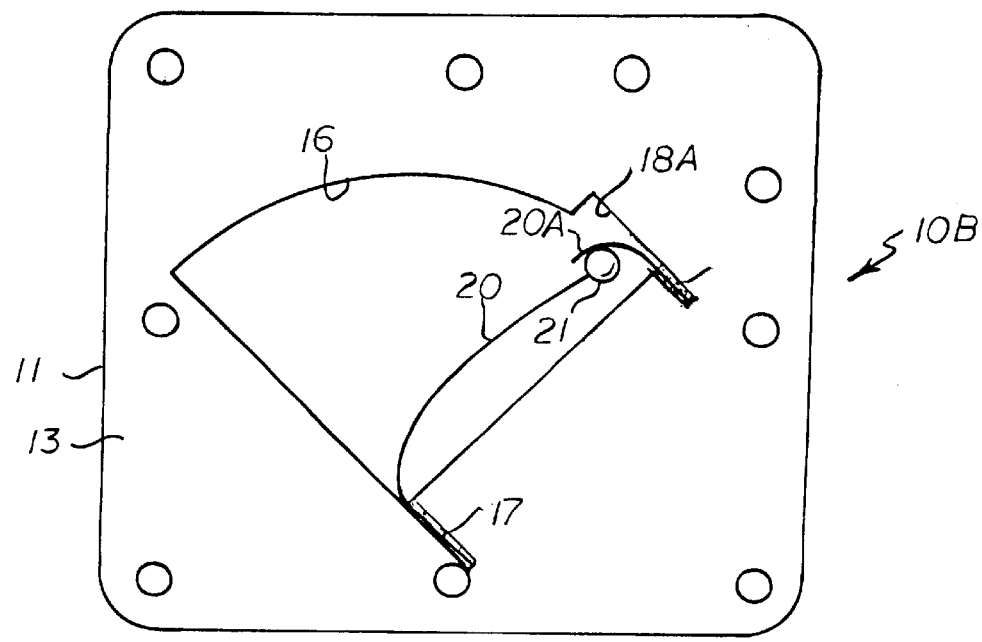
FIGS. 5 and 5A are enlarged front views of another modification of the disposable cumulative thermal exposure monitor with the faceplate removed having a shape memory alloy latch pin arrangement, showing it in the latched and unlatched positions, respectively.
Figure 5A:
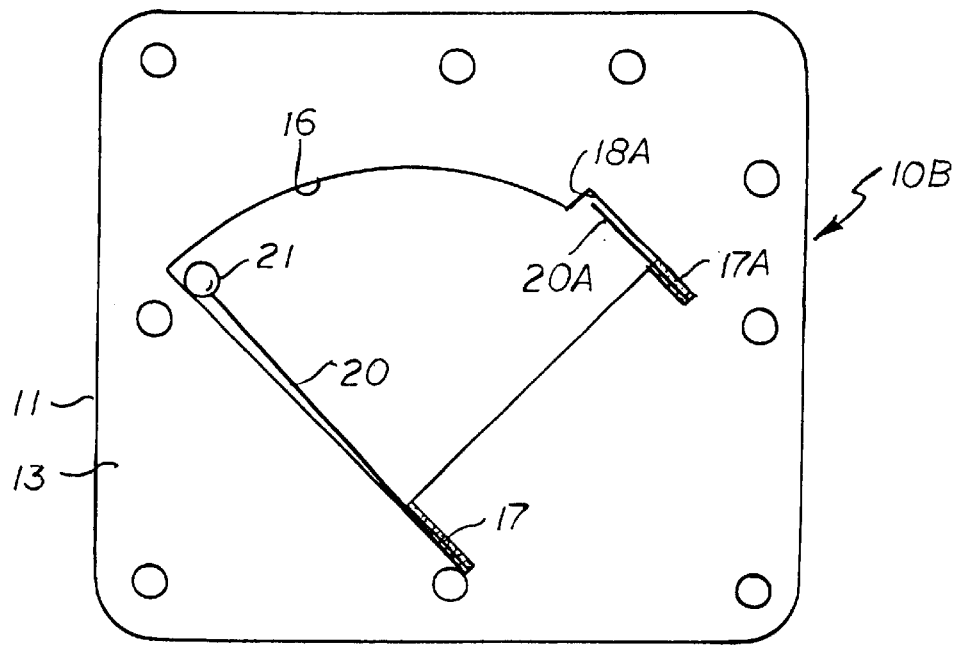

FIGS. 5 and 5A shown another modification of the cumulative thermal exposure monitor 10B having a shape memory alloy latch pin arrangement. In FIGS. 5 and 5A, the same numerals of reference are used to identify the components previously described, but the detailed description of the components will not be repeated to avoid repetition. In this modification, a second small slot 17A extends a short distance laterally outwardly from the curved portion of the pie-shaped recess 16 and a rectangular recess 18A extends upwardly from the curved portion at one side adjacent to the slot 17A. A second stiff thin rectangular strip or wire 20A formed of shape memory alloy (SMA) material having an initial curved remembered configuration has one end secured in the slot 17A and serves as the latch member. As shown in FIG. 5, in its curved configuration, the latch member 20A is engaged with the enlarged colored bead or marker 21 at the top end of the first wire 20 to hold it in its curved biased position. As shown in FIG. 5A, the shape memory alloy latch member 20A will change to a straight configuration upon absorbing temperatures below its austenitic start temperature, and will become disengaged from the bead or marker 21 to allow the first wire 20 to change from its initial curved shape to its remembered straight shape.

One of the important features of the present invention is that it is designed to mimic the thermodynamic properties of the food or product on which it is to be used. The material and thickness of the outer housing plates 12 and 13 are selected to provide a known desired thermal conductivity based upon the type of food or product for which it is to be used. The shape memory alloy wire 20 is formed to have a predetermined threshold temperature (shape memory alloy transformation temperature) such that the response of the monitor is related to the degree of spoilage of the particular food or product. For example, a cumulative thermal exposure monitor can be provided to measure the total heat absorbed above 40° F. Regardless of how many times the cumulative thermal exposure monitor was put into and taken out of the freezer, the indicator would show the total heat exposure at temperatures above 40° F.

Figure 6:
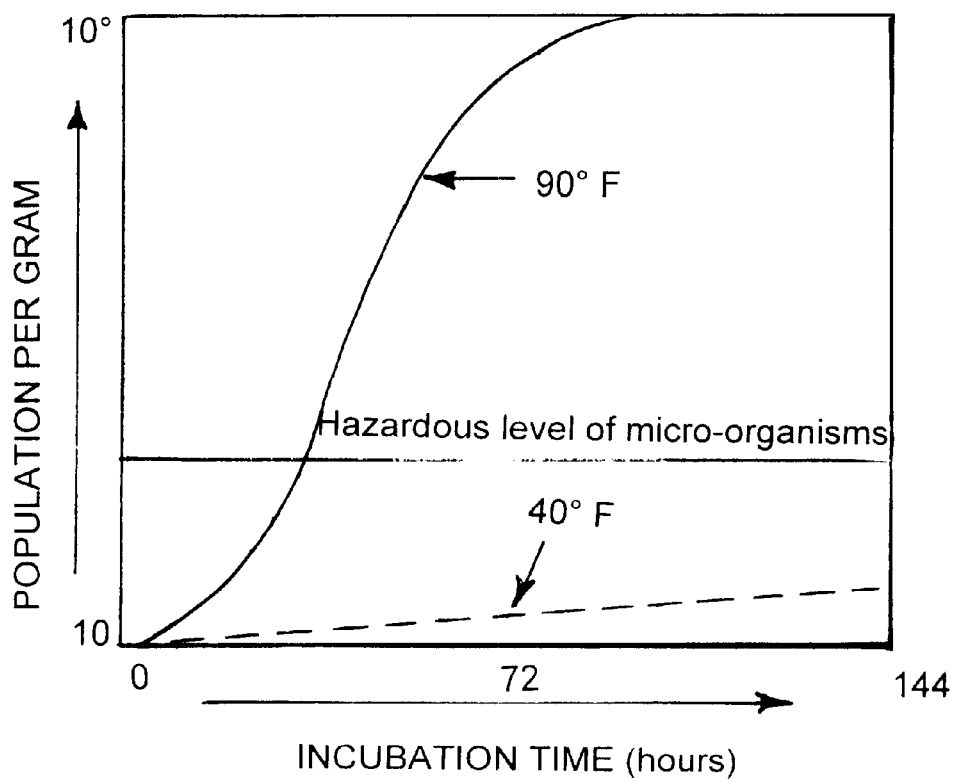
FIG. 6 is a chart illustrating a time-temperature-deterioration curve that may be used to design cumulative thermal exposure monitors having predetermined thermodynamic responses.

Thus, the present cumulative thermal exposure monitors may be provided in a wide variety of models to monitor different perishable products. To achieve the desired thermodynamic properties, time-temperature-deterioration curves, such as shown in FIG. 6, may be used. In the example of FIG. 6, the deterioration due to microbial growth caused by prolonged exposure to elevated temperature is shown. The thermal conductivity of the housing and the threshold temperature (shape memory alloy transformation temperature) of the shape memory alloy wire can be adjusted to respond in accordance with the curve.

In the embodiments of FIGS. 1–5, the scale 25 is divided into three different colored sections and/or indicia that visually represent ranges of thermal conditions related to the product, i.e., "GOOD", "CAUTION" and "BAD", with the "GOOD" section representing the state that the monitor 10, 10A or 10B was in at the time it was affixed to the food or product and the food or product was cooled to the proper temperature. After the monitor 10, 10A, or 10B is affixed to the product, package or container, and the goods have reached the desired temperature, the latch pin 23 is pulled out of the housing 11 or, in the embodiment of FIGS. 3 and 4, the pin 28 is retracted. In the embodiment of FIGS. 5 and 5A, the latch member 20A is disengaged upon it dropping below its austenitic start temperature.

The position of the marker 21 at the free end of the shape memory alloy wire 20 will indicate the thermal environment surrounding the product, package or container on which the monitor is affixed. As the shape memory alloy wire 20 exceeds its transformation temperature, it starts to return to its remembered state (straight shape). For example, when the marker is in the "GOOD" section, it indicates that the temperature is within the acceptable limits; when the marker is in the "CAUTION" section, it indicates that the threshold temperature has been exceeded; and when it is in the "BAD" section, it indicates that the temperature has exceeded the threshold temperature for a sufficient amount of time to cause significant deterioration. In other words, the shape memory alloy has exceeded its transformation temperature and has stayed above that temperature long enough to cause significant deterioration.

The shape memory alloy wire 20 with the marker 21 on its outer end will deflect from "GOOD" to "BAD" at a rate dependent upon how rapidly heat is absorbed into the device. In the event that the temperature should drop below the transformation temperature ("CAUTION" section) while the device was responding, the shape memory alloy wire 20 would remain in the position it last attained.

Thus, upon arrival or departure at an inspection point in the distribution chain, one could quickly and easily determine whether the food or product is presently, or has previously been, exposed to temperature exceeding the threshold temperature and/or for a sufficient amount of time to cause significant deterioration of the product.

Referring again to FIG. 1, there is shown another modification of the cumulative thermal exposure monitor that may also have any of the previously described latching options. In this embodiment, radioactive material is incorporated into the shape memory alloy element 20 and/or the bead or marker 21, and a piece of film material F (indicated in dashed line) is affixed to the underside of the faceplate 12 beneath the window 15. The film material F is an optically stimulated luminescence material, thermo-luminescence material or photochromic material (which includes radio-chromic materials and others). The film F is disposed in close proximity to the shape memory alloy element 20 and the marker 21. A piece of opaque tape T is affixed to the front surface (top side) of the faceplate 12 in superposed relation to the film F on the underside of the faceplate. For films that are sensitive to ambient light, additional light protective coatings may be applied to the film, or the housing may be configured to isolate the film from ambient light.

When the monitor is in the unlatched condition and the shape memory alloy element 20 and marker 21 start their arcuate path across the device, the film F will be altered by exposure to the radiation emitted by the radioactive material with respect to time and location of the shape memory alloy element 20 or marker 21. For example, a radiochromic film will darken when exposed to radiation and become darker the longer it is exposed. After the product on which the monitor is affixed has arrived at its destination, the film F can be evaluated to derive a precise time and temperature log of environmental thermal events by utilizing means well known for radiation dosimetry and knowledge of the response characteristics of the shape memory alloy.

FIGS. 7A through 7D illustrate another embodiment of the disposable cumulative thermal exposure monitor having a different type of indicator. In this embodiment, the monitor 30 has a generally rectangular thermodynamic outer housing 31 which, in a preferred embodiment, is about the size of a postage stamp and is formed of a faceplate 32 and a back plate 33 secured together. The faceplate 32 and back plate 33 of the housing 31 are formed of a rigid thermally conductive plastic or composite material capable of being sterilized by chemicals, heat or ionizing radiation. The faceplate 32 has a clear rectangular window portion 34 and a scale 35 laterally adjacent to the window. Although the housing is shown for purposes of illustration as being rectangular, it should be understood that the housing may be circular or various other configurations The scale 35 is divided into three different colored sections and/or indicia that visually represent ranges of thermal conditions related to the product, i.e., "GOOD", "CAUTION" and "BAD", with the "GOOD" section being lowermost section and representing the state that the monitor 30 was in at the time it was affixed to the food or product and the food or product was cooled to the proper temperature.

As with the previous embodiment, the materials and thickness of the outer housing plates are selected to provide a known desired thermal conductivity based upon the type of food or product in which it is to be used. An adhesive material (not shown) may also be applied to the back surface of the back plate of the outer housing for attaching the housing to a product or food packaging material.

The front surface of the back plate 33 has a generally bell-shaped recess 36 with a cylindrical or rectangular upper portion 37. A channel or slot 38 extends transversely across the upper portion 37 and laterally to one side thereof. A thin stiff latch pin 39 slidably disposed in the slot 38 extends across the upper portion 37 of the bell-shaped recess 36 and has a small bead or protuberance 40 at its outer end that extends upwardly through a narrow rectangular slot 38A in the faceplate 32 for sliding the pin 39 laterally in and out relative to the upper portion 37.

A synthetic rubber or elastomeric seal (not shown) having a central bore may be disposed at the inward facing end of the slot 38 with the inward facing end of the latch pin 39 extending through the seal.

In this embodiment, a stiff thin rectangular strip or wire of shape memory alloy (SMA) material 41 having an narrow inverted generally V-shaped (parabolic) remembered configuration (FIG. 7D) is disposed in the bell-shaped recess 36 with its raised midsection (apex) at the lower end of the upper portion 37. In the remembered configuration, the apex angle of the wire 41 is about 30°. A colored rectangular member or fluted disk 42 is slidably disposed in the cylindrical upper portion 37 of the bell-shaped recess 36. The rectangular member or disk 42 is sized to frictionally engage the interior of the cylindrical upper portion 37 with sufficient force to prevent it from sliding due to gravity but allow it to slide under the force of the shape memory alloy wire 41.

Figure 7A:
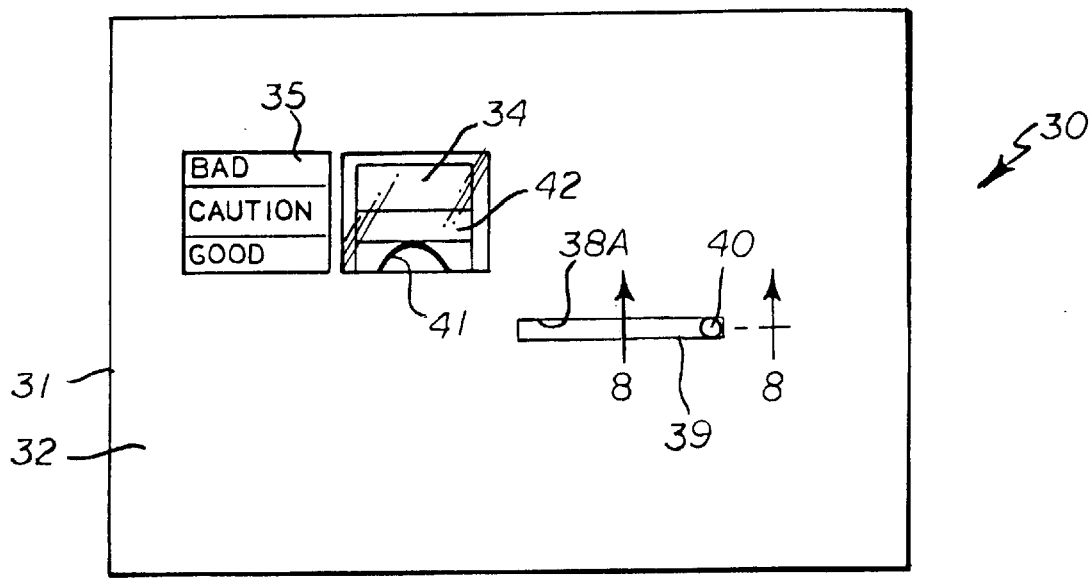
FIG. 7A is an enlarged front view of another embodiment of the single-use disposable embodiment of the cumulative thermal exposure monitor having a different type of indicator.
Figure 7B:
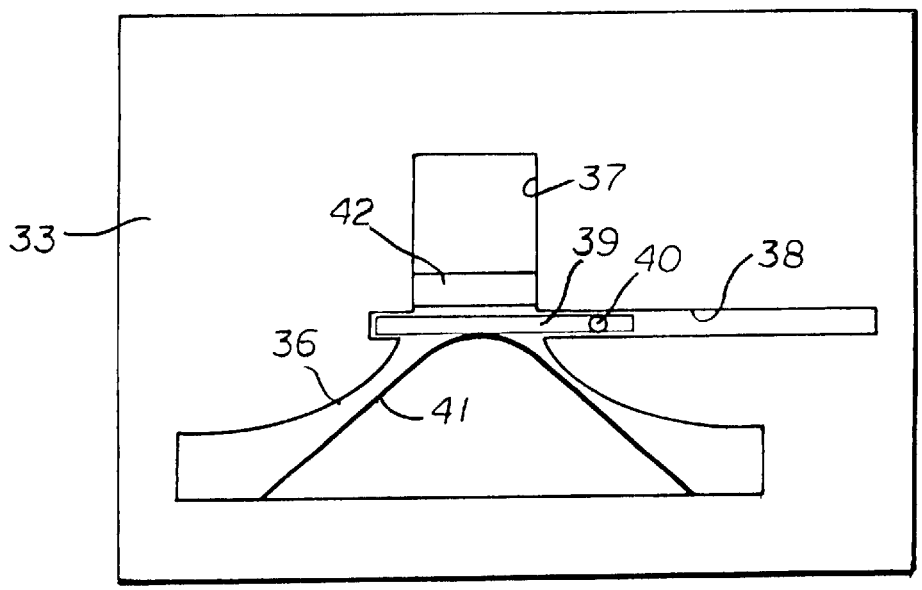
FIGS. 7B, 7C, and 7D are enlarged front views of the embodiment of FIG. 7A with the faceplate removed, and showing the indicator in various positions.

As seen in FIG. 7B, in the inactive latched position, the rectangular member or fluted disk 41 rests on the top surface of the latch pin 39, and the raised midsection (apex) of the shape memory alloy wire 41 is biased downwardly and held in placed by the latch pin 39. In the downwardly biased configuration, the apex angle of the wire 41 is about 60°. With the shape memory alloy wire 41 in the inactive position, the bell-shaped recess 36 and cylindrical upper portion 37 are filled with a fluid such as propylene glycol or air, or the air is removed to create a vacuum, and the faceplate 32 and back plate 33 are sealed together to provide a fluid tight unit. To activate the device, after it has been affixed to the food or product and given time to cool down, the pin 39 is retracted laterally to allow the shape memory alloy wire 41 to change to its remembered configuration which then engages the rectangular member or disk 42 to move it upwardly in the upper portion 37.

Figure 8:
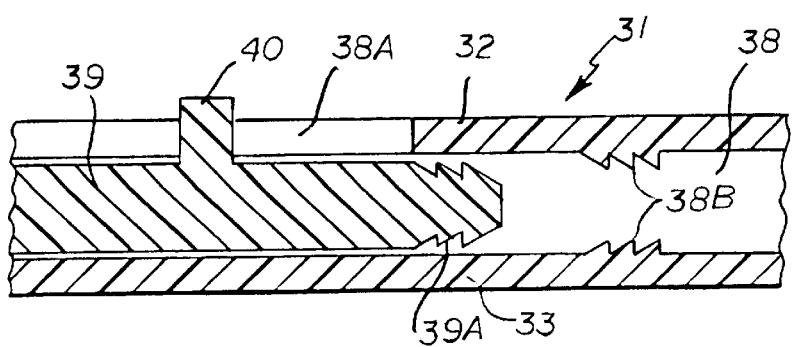
FIG. 8 is a greatly enlarged view of the latch pin of the embodiment of FIG. 7A showing the details of the latch pin locking arrangement.

As shown in greater detail in FIG. 8, the outer end of the slot 38 is provided with a series of protuberances 38B which engage mating protuberances 39A on the latch pin 39 to lock the pin in the retracted position.

Figure 7C:
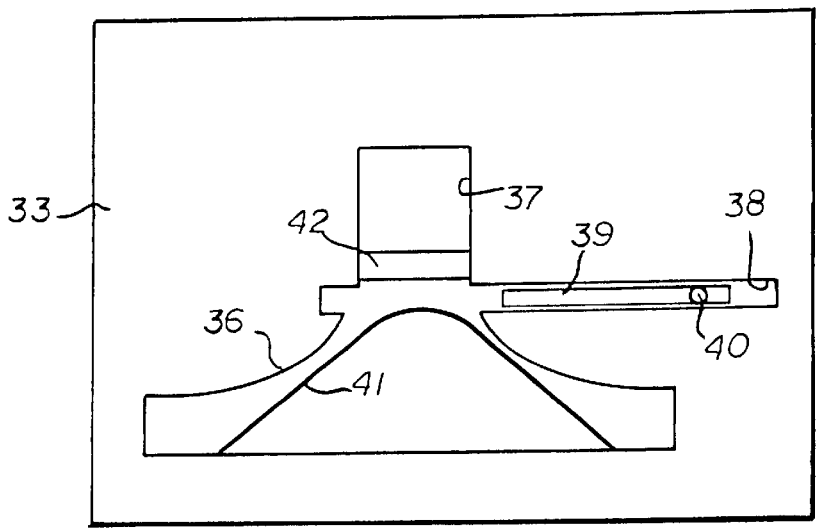

FIG. 7C shows the monitor in the active position with the latch pin 39 in the retracted position and the shape memory alloy wire 41 in a position after the device has been affixed to the food or product and given time to cool down.

Figure 7D:
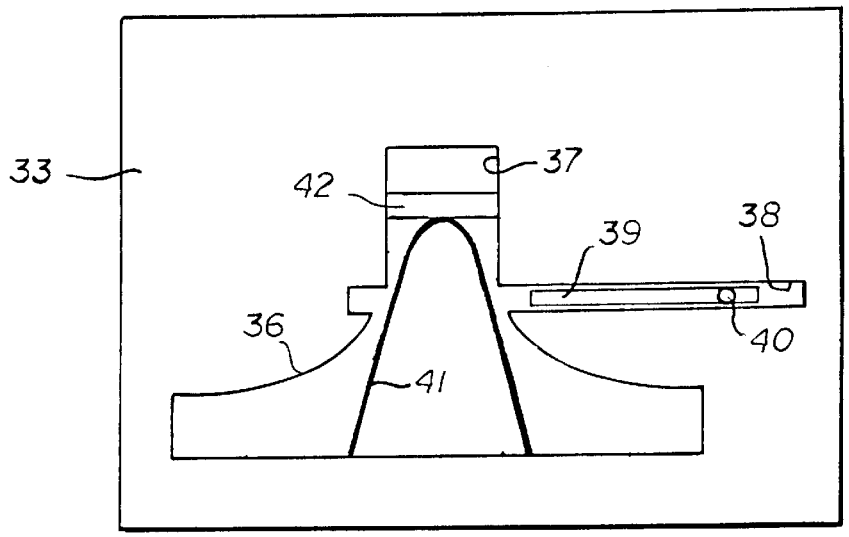

FIG. 7D shows the monitor 30 in the active position with the shape memory alloy wire 41 and rectangular member or fluted disk 42 in a position indicating that the environment surrounding the food or product to which the monitor is attached has exceeded the threshold temperature (the shape memory alloy transformation temperature), and has stayed above that temperature long enough to cause significant deterioration. As the shape memory alloy wire 41 exceeds its transformation temperature it starts to return to it's remembered state and its apex angle decreases thereby forcing the fluted disk 42 upwardly in the upper portion 37. The rectangular member or fluted disk 42 remains wedged in the upper portion 37 at the highest point at which the shape memory alloy wire 41 was able to expand.

The following is an example of how the embodiments of FIGS. 1–5 or 7A may be used. A meat wholesaler ships large volumes of ground beef via an independent trucking company. The ground beef is packaged in boxes each weighing 40 pounds. A typical shipment consists of 50 boxes (2000 lbs.). The shipments are typically from the warehouse to a fast-food restaurant. Because the restaurants are busy and the delivery truck has to deliver to several restaurants, the boxes of meat are sometimes left on the loading dock for a time until the restaurant employees have time to rearrange the freezer and put the meat away. The meat is stored at the warehouse at −20° F. and is shipped in a truck that is supposed to be maintained at 0° F. According to the regulatory guidelines the meat must never be exposed to temperatures above 40° F. for more than a total of 4 hours prior to cooking and consumption.

Obviously, the boxes of meat sitting on the loading dock of the restaurant are exposed to ambient (room) temperature. If allowed to sit on the loading dock for a significant period of time the meat would spoil. However, a short stay on the loading dock does not endanger the freshness of the meat.

A disposable cumulative thermal exposure monitor 10, 10A, 10B or 30 attached to each box of meat before it is initially frozen at the wholesaler's warehouse (at the time the frozen meat is prepared for shipment the monitors would be unlatched or "activated") would indicate that during the whole transport process the meat was never subjected to a prolonged elevated temperature. In the event that during transport or storage the meat was exposed to a temperature above the selected threshold temperature and held above that temperature for a period long enough to cause significant deterioration, the indicator 21 or disk 42 of the monitor would be positioned corresponding to that degree of deterioration. At a glance an inspector or worker could determine if conditions existed where a dangerous degree of spoilage may have occurred during the whole transport process.

Figure 9A:
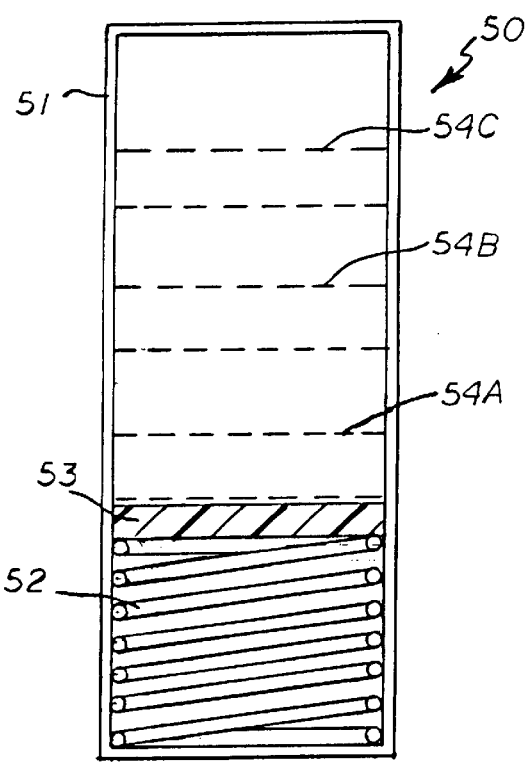
FIGS. 9A and 9B are enlarged longitudinal cross section views of a tubular embodiment of the disposable cumulative thermal exposure monitor utilizing a single coiled spring formed of shape memory alloy.
Figure 9B:
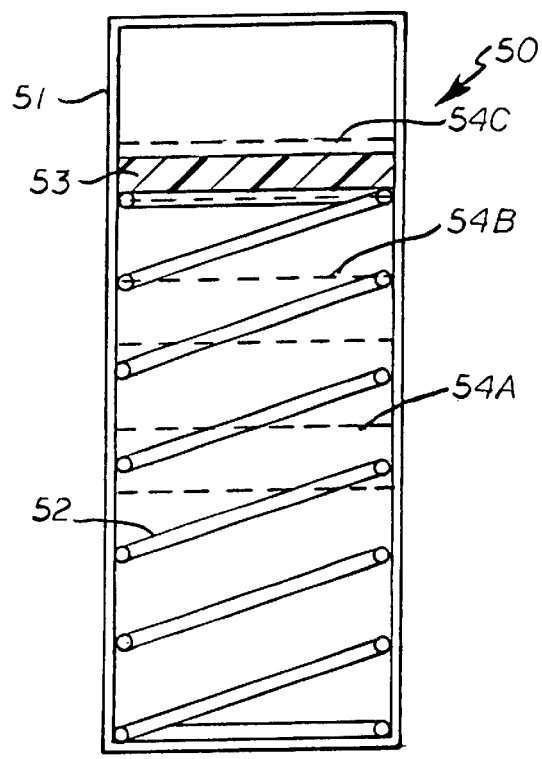

FIGS. 9A and 9B show a tubular embodiment of a disposable cumulative thermal exposure monitor 50. In this embodiment, the outer housing 51 is a tubular member enclosed at each end and filled with a fluid such as propylene glycol or air, or the air is removed to create a vacuum. As with the previous embodiments, the materials and thickness of the outer housing are selected to provide a known desired thermal conductivity based upon the type of food or product on which it is to be used. An adhesive material (not shown) may also be applied to the exterior surface of the outer housing for attaching the housing to a product or food packaging material.

In this embodiment, a coiled spring 52 formed of shape memory alloy (SMA) is disposed in the lower portion of the tubular housing 51. The spring 52 has a remembered expanded (increased length) configuration. A colored fluted disk 53 is slidably disposed inside the housing 51 above the spring 52. The disk 53 is sized to frictionally engage the interior side wall of the tubular housing 51 with sufficient force to prevent it from sliding due to gravity but allow it to slide under the force of the shape memory alloy spring 52.

The exterior of the housing 51 is provided with three longitudinally spaced transparent sections 54A, 54B and 54C (represented by dashed lines) and/or lines or indicia that allow the position of the disk to be visually observed and correspond to ranges of thermal conditions related to the product, i.e., "GOOD", "CAUTION" and "BAD", with the "GOOD" section being the lowermost section and representing the state that the monitor 50 was in at the time it was affixed to the food or product and the food or product was cooled to the proper temperature.

FIG. 9A shows the monitor 50 in the active position with the shape memory alloy spring 52 and fluted disk 53 in the lowermost position after the device has been affixed to the food or product and given time to cool down. As the shape memory alloy spring 52 exceeds its transformation temperature it starts to return to its remembered state and expands in length thereby forcing the fluted disk 53 upwardly in the housing. FIG. 9B shows the shape memory alloy spring 52 and fluted disk 53 in a position indicating that the environment surrounding the food or product or package to which the monitor is attached has exceeded the threshold temperature (the shape memory alloy transformation temperature), and has stayed above that temperature long enough to cause significant deterioration. The fluted disk 53 remains wedged in the upper portion of the housing 51 at the highest point at which the shape memory alloy spring 52 was able to expand.

Figure 10C:
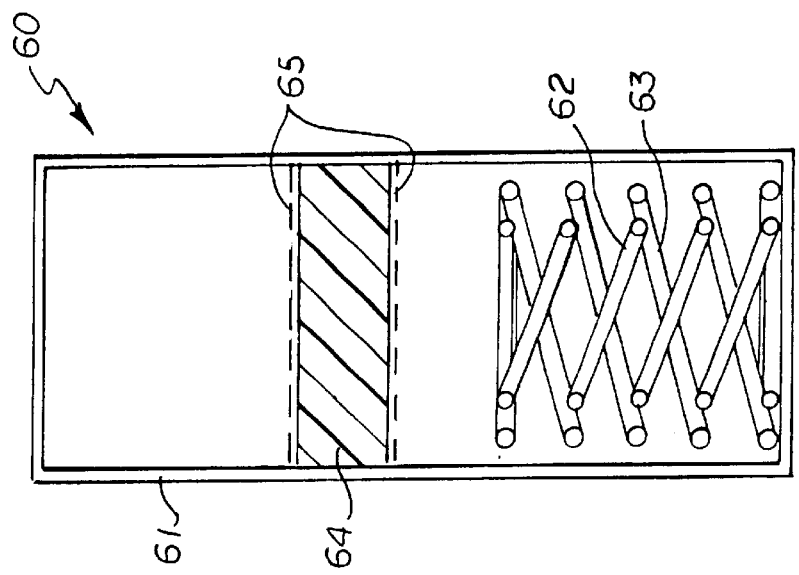
FIGS. 10A, 10B and 10C are enlarged longitudinal cross section views of a tubular embodiment of the disposable cumulative thermal exposure monitor utilizing a concentric pair of coiled springs formed of shape memory alloy.
Figure 10B:
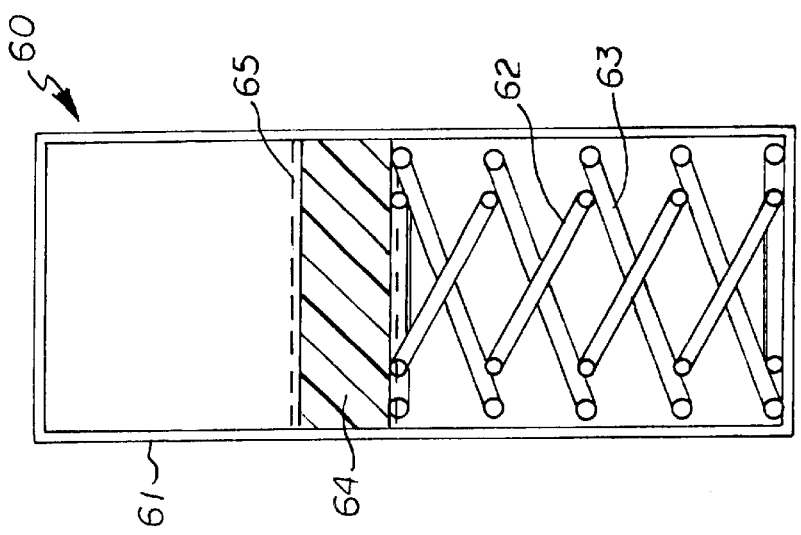
Figure 10A:
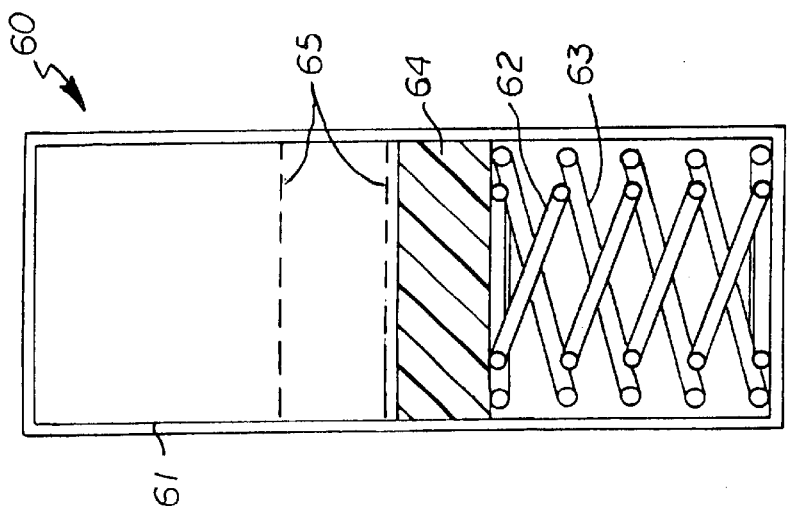

FIGS. 10A, 10B and 10C are enlarged longitudinal cross section views of a tubular embodiment of the disposable thermal exposure monitor 60 utilizing a concentric pair of coiled springs formed of shape memory alloy. The outer housing 61 is a tubular member enclosed at each end and filled with a fluid such as propylene glycol or air, or the air is removed to create a vacuum. As with the previous embodiments, the material and thickness of the outer housing are selected to provide a known desired thermal conductivity based upon the type of food or product on which it is to be used. An adhesive material (not shown) may also be applied to the exterior surface of the outer housing for attaching the housing to a product or food packaging material.

In this embodiment, there are two concentric coil springs formed of shape memory alloy (SMA) disposed in the lower portion of the tubular housing 61, each with a different transformation temperature. A smaller spring 62 is nested inside of a larger spring 63. The larger spring 63 has a remembered collapsed (reduced length) configuration and the smaller spring 62 has a remembered expanded (increased length) configuration. The two springs 62 and 63 are physically connected at both ends. The smaller spring 62 exhibits super elasticity; for example, its transformation temperature normally would be approximately –50° C. The larger spring 63 has an austenitic start temperature that is set to correspond to the critical temperature of the product to be monitored.

A colored fluted disk 64 is slidably disposed inside the housing 61 at the top end of the springs 62 and 63. The disk 64 is sized to frictionally engage the interior side wall of the tubular housing 61 with sufficient force to prevent it from sliding due to gravity but allow it to slide under the force of the shape memory alloy springs.

The exterior of the housing 61 is provided with a transparent section 65 (represented by dashed lines) above the disk 64 in its lowermost position that allows the disk to be visually observed when moved upwardly into that section, and the vertical position of the transparent section corresponds to the thermal condition related to the product that would cause significant deterioration.

FIG. 10A shows the monitor 60 in the active position with the shape memory alloy springs 62, 63 and fluted disk 64 in the lowermost position after the device has been affixed to the food or product. In the initial starting configuration, the larger spring 63 compresses the smaller spring 62. As the larger spring 63 drops below its austenitic start temperature it can no longer restrain the smaller spring 62 it surrounds and it expands in length thereby forcing the fluted disk 64 upwardly in the housing. FIG. 10B shows the shape memory alloy springs 62,63 and fluted disk 64 in a position indicating that the environment surrounding the food or product to which the monitor is attached has fallen below the threshold temperature (the critical temperature), and has stayed below that temperature long enough to cause significant deterioration. As shown in FIG. 10C, if the food or product is re-warmed, the springs 62 and 63 reassume the initial lowermost (collapsed) position, however, the fluted disk 64 remains wedged in the upper portion of the housing 61 at the highest point at which the shape memory alloy springs were able to expand.

Figure 11C:
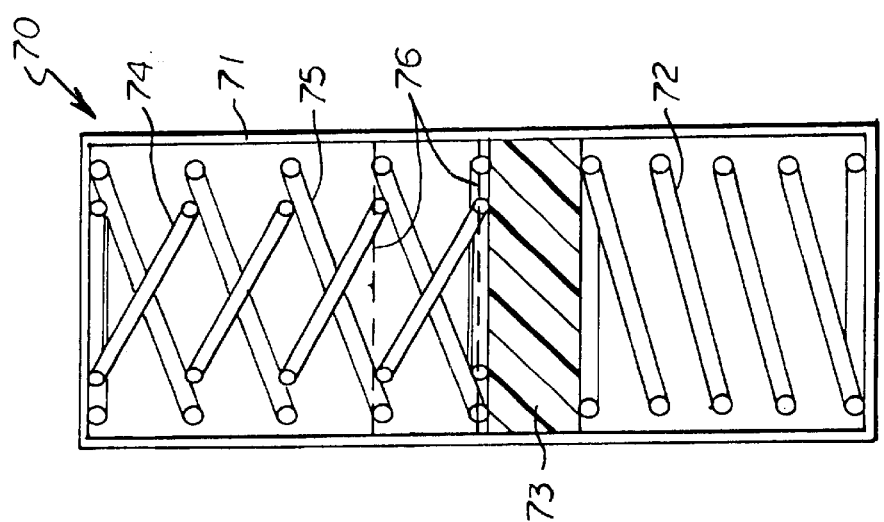
FIGS. 11A, 11B and 11C are enlarged longitudinal cross section views of a tubular embodiment of a self re-setting thermal exposure monitor utilizing a concentric pair of coiled springs and a third coil spring formed of shape memory alloy.
Figure 11B:
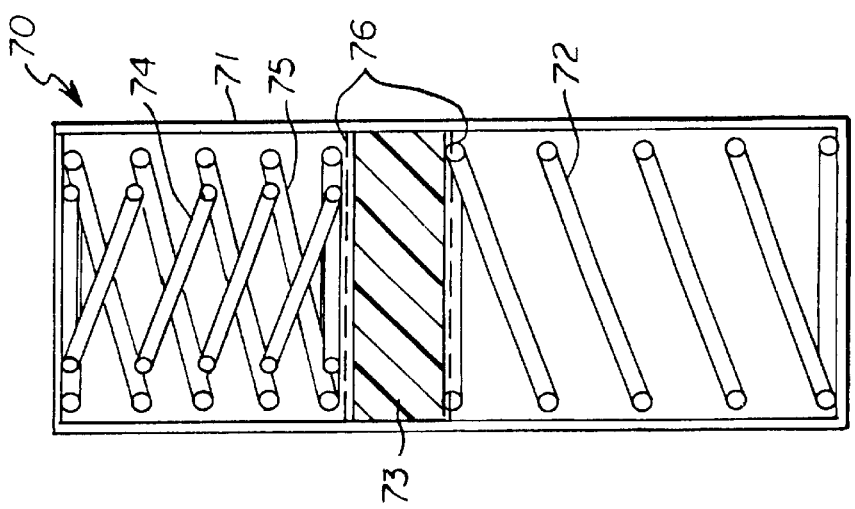
Figure 11A:
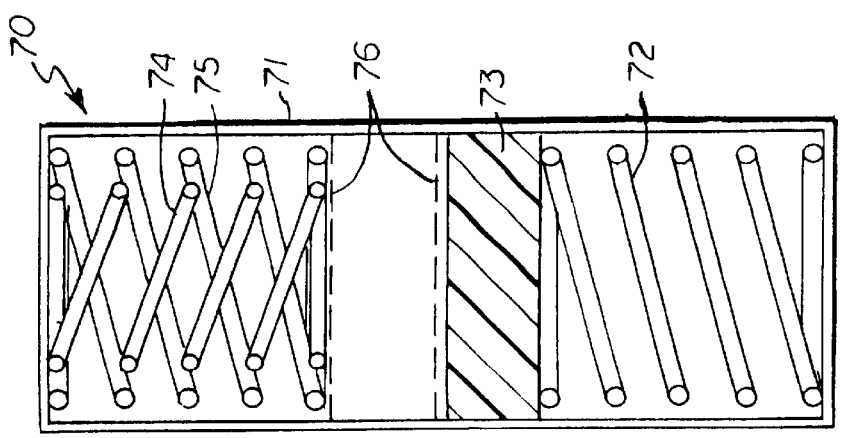

The following is an example of how the disposable tubular monitor embodiment of FIG. 10A may be used. A seafood processor knows that a certain parasite can be eliminated by a 5 hour exposure to a temperature below –20° C. To answer this need the processor would affix a cooling rate monitor 60 to each of the containers of seafood before processing. After the processing was done a worker could tell at a glance if any specific container of seafood had been processed as required just by noting the position of the colored disk 64 in the monitor's window FIGS. 11A, 11B and 11C are enlarged longitudinal cross section views of a tubular embodiment of a self re-setting thermal exposure monitor 70 utilizing a concentric pair of coiled springs and a third coil spring formed of shape memory alloy (SMA), each having a different transformation temperature. The outer housing 71 is a tubular member enclosed at each end and filled with a fluid such as propylene glycol or air, or the air is removed to create a vacuum. As with the previous embodiments, the material and thickness of the outer housing are selected to provide a known desired thermal conductivity based upon the type of food or product for which it is to be used. An adhesive material (not shown) may also be applied to the exterior surface of the outer housing for attaching the housing to a product or food packaging material.

In this embodiment, a coiled spring 72 formed of memory alloy (SMA) is disposed in the lower portion of the tubular housing 71. The spring 72 has a remembered expanded (increased length) configuration. A colored fluted disk 73 is slidably disposed inside housing 71 at the top end of the spring 72. The disk 73 is sized to frictionally engage the interior side wall of the tubular housing 71 with sufficient force to prevent it from sliding due to gravity but allow it to slide under the force of the shape memory alloy springs.

Two concentric coil springs formed of memory alloy (SMA) are disposed in the upper portion of the tubular housing 71 above the disk 73, each with a different transformation temperature. A smaller spring 74 is nested inside of a larger spring 75. The larger spring 75 has a remembered collapsed (reduced length) configuration and the smaller spring 74 has a remembered expanded (increased length) configuration. The two springs 74 and 75 are physically connected at both ends. The smaller spring 74 exhibits super elasticity; for example, its transformation temperature normally would be approximately −50° C. The larger spring 75 has an austenitic start temperature (reset temperature) that is set to respond at a temperature sufficient to reset the device.

The exterior of the housing 71 is provided with a transparent section 76 (represented by dashed lines) above the disk 73 in its lowermost position that allows the disk to be visually observed when moved upwardly, and the vertical position of the transparent section corresponds to the thermal conditions related to the product that would cause significant deterioration.

FIG. 11A shows the monitor 70 in the active position with the shape memory alloy springs 72, 74 and 75 and fluted disk 73 in their respective positions after the device has been affixed to the food or product and given time to cool down. In the initial starting configuration, the larger spring 75 compresses the smaller spring 74. As the lower shape memory alloy spring 72 exceeds its transformation temperature it starts to return to its remembered state and expands in length thereby forcing the fluted disk 73 upwardly in the housing.

FIG. 11B shows the shape memory alloy spring 72 and fluted disk 73 in a position indicating that the environment surrounding the food or product to which the monitor is attached has exceeded the threshold temperature (the shape memory alloy transformation temperature), and has stayed above that temperature long enough to cause significant deterioration.

FIG. 11C shows the shape memory alloy springs 72, 74 and 75 and fluted disk 73 in the reset position indicating that the environment surrounding the food or product to which the monitor is attached has dropped below the reset temperature (austenitic start temperature of larger spring). As the larger spring 75 drops below its austenitic start temperature it can no longer restrain the smaller spring 74 it surrounds and both springs expand in length thereby forcing the fluted disk downwardly and compressing the lower spring 72. Once the device is warmed back to the initial temperature level it will revert back to its original starting configuration (FIG. 11A).

The following is an example of how the self-resetting tubular monitor embodiment of FIG. 11A may be used. A genetic research supply company produces thermally unstable research reagents that must be kept at a temperature below −20° C. or they will become deteriorated to a point to where they are no longer useful. These products will last no more than 20 minutes at room temperature. Normally these reagents are shipped in special reusable insulated shipping packages, which are sent back to the company after use. Sometimes there are shipping delays and these products are held at a warehouse or elsewhere for a day or more. This may be a problem if there is not enough dry ice in the package. Often the researchers who purchase these products are not willing to accept them unless they know the product has been held below −20° C. for the entire trip. A self-resetting monitor 70 set to reset at −40° C. may be placed into the reusable packages by the supply company to provide proof of the state of the reagent, rather than relying on guesswork. The self-resetting device, when recycled, would automatically reset itself for the next trip (once dry ice was put into the package for the next trip) without human intervention.

While this invention has been described fully and completely with special emphasis upon a preferred embodiment, it should be understood that within the scope of the appended claims the invention may be practiced otherwise than as specifically described herein.

What is claimed is:

1. A cumulative thermal exposure monitor for indicating absorption of heat outside of a prescribed temperature range for a prescribed period of time, comprising:

a thermally-conductive housing having a transparent window portion, said housing formed of a material having prescribed thermal properties;

a thermally-responsive member in said housing formed of a shape memory alloy having a first shape at temperatures below a critical temperature and changing to a second shape at temperatures above the critical temperature and having a transformation temperature range encompassing said prescribed temperature range;

indicator means associated with said thermally-responsive member to be moved from an initial position thereby as said thermally-responsive member moves between said first shape and said second shape so as to be visually observed through said window;

a photochromic film material disposed in said housing closely adjacent to said indicator means and said thermally-responsive member;

either of said indicator means or said thermally-responsive member containing a radiation emitting substance to effect said film material;

said prescribed thermal properties of said housing and said transformation temperature range of said shape memory alloy correlated such that said thermally-responsive member moves between said first shape and said second shape upon absorption of heat above said critical temperature for said prescribed period of time;

said indicator means remaining in a position at which it was moved by said thermally-responsive member to indicate the absorption of heat above said critical temperature for said prescribed period of time; and said film is altered by exposure to the radiation emitting substance with respect to time and location of said indicator means and said thermally-responsive member as said thermally-responsive member changes from said first shape to said second shape to provide a time and temperature log of environmental thermal events indicating absorption of heat above said critical temperature for said prescribed period of time.

2. A cumulative thermal exposure monitor for indicating absorption of heat outside of a prescribed temperature range for a prescribed period of time, comprising:

a thermally-conductive housing having a transparent window portion, said housing formed of a material having prescribed thermal properties;

a thermally-responsive member in said housing formed of a shape memory alloy having a first shape at temperatures below a critical temperature and changing to a second shape at temperatures above the critical temperature and having a transformation temperature range encompassing said prescribed temperature range;

indicator means associated with said thermally-responsive member to be moved from an initial position thereby as said thermally-responsive member moves between said first shape and said second shape so as to be visually observed through said window;

a latch member having one end disposed in said housing formed of a thin strip or wire of shape memory alloy material having an initial remembered configuration and changing to a second configuration at or below a prescribed austenitic start temperature;

said latch member in said initial remembered configuration is engaged with said indicator means to hold said thermally-responsive member in its said first shape and upon said latch member reaching its said prescribed austenitic start temperature changing to its said second configuration and becoming disengaged therefrom to allow said thermally-responsive member to change to its said second shape;

said prescribed thermal properties of said housing and said transformation temperature range of said thermally-responsive member shape memory alloy correlated such that said thermally-responsive member moves between said first shape and said second shape upon absorption of heat above said critical temperature for said prescribed period of time; and said indicator means remaining in a position at which it was moved by said thermally-responsive member to indicate the absorption of heat above said critical temperature for said prescribed period of time.

* * * * *